Jan. 24, 1967    A. G. BODINE, JR    3,299,722
MECHANICAL SONIC VIBRATION GENERATOR WITH FREQUENCY
STEP-UP CHARACTERISTIC
Filed Oct. 8, 1964    5 Sheets-Sheet 1

INVENTOR.
Albert G. Bodine, Jr.
BY
Ernest J. Lilly
Attorney

United States Patent Office 3,299,722
Patented Jan. 24, 1967

3,299,722
MECHANICAL SONIC VIBRATION GENERATOR
WITH FREQUENCY STEP-UP CHARACTERISTIC
Albert G. Bodine, Jr., Los Angeles, Calif.
(7877 Woodley Ave., Van Nuys, Calif. 91406)
Filed Oct. 8, 1964, Ser. No. 402,474
7 Claims. (Cl. 74—87)

This application is a continuation-in-part of my application entitled, Apparatus for Generating and Transmitting Sonic Vibrations, Serial No. 55,537, filed September 12, 1960, now Patent No. 3,153,530, which was a division of my parent application entitled, Method and Apparatus for Generating and Transmitting Sonic Vibrations, Serial No. 825,117, filed July 6, 1959, now Patent No. 2,960,314. This application is also a continuation-in-part of my copending application entitled, Sonic Soil Cultivator, Serial No. 370,217, filed May 26, 1964.

This invention relates generally to methods and apparatus for the generation and transmission of relatively high power by means of intense sonic vibrations, particularly for generation or transmission of sonic vibrations in resonant vibratory mechanical devices, either elastically deformable vibratory bodies of the distributed constant class, or elastically supported bodily vibratory devices of lumped constant characteristics.

A large number of industrial uses for high power sonic vibrations have been discovered. It is known, for example, that intense sonic energy may be applied to gases, liquids or solids to produce certain desired chemical or physical effects. Many types of power tools or other equipment are operated by sonic energy of high intensity. Illustrative examples include a longitudinally extended elastic bar, in which a longitudinal or a lateral resonant standing wave can be set up and maintained, so that an end portion of the bar becomes the location of a velocity antinode of such standing wave, and utilized to do the work. Other modes of vibration are also illustrated.

The bodies or devices to be sonically vibrated at resonance are often characterized by high acoustic impedance. They vibrate with great force, and with small velocity amplitude. The problem of driving these devices, i.e., the provision of an effective vibration generator suited thereto, is often very difficult, particularly in view of the fact that ordinary practically available sources of motivating power operate at low impedance, characterized by driver elements moving with relatively low force but substantial velocity. Ordinary low impedance drivers are incapable of driving high impedance devices because of the mismatch of impedance. The efficiency of transduction has been characteristically low.

The common sonic generators, such as magneto-striction bars, crystals, etc., are capable of a motion of only a few feet per second by reason of limitations set by elastic strain limits, which motion I have found to be entirely inadequate for high power applications.

Mechanical generators are known which have the requisite motional characteristics, but suffer from complexity and a host of ensuing problems. Any degree of complexity of moving parts results in various vibratory interactions taking place at high frequency between these parts, with consequent high energy loss and frequent destruction of parts in high stress applications. At very high frequencies gears will chatter, bearing separators seize and fracture, and the individual balls or rollers of anti-friction bearings are forced to rotate so fast they become unstable in their motion. Plain journal bearings seize and overheat. The power of previously known generators has been relatively low, particularly at the higher frequencies; and the ruggedness required of an industrial machine has been lacking. Many proposed industrial applications of sonic power have been correspondingly handicapped.

It is accordingly the primary general object of the present invention to provide novel and improved sonic vibration generating methods and apparatus particularly suited to various industrial applications and characterized by relatively high power output, efficiency of transduction, simplicity, and ruggedness.

The invention is practiced in systems embodying a rotary drive oscillator involving the driving of an inertia-mass rotor in a cyclic or orbital path under guiding constraint of a stroke-limiting or bearing means, whereby a centrifugal force is exerted on the latter, with a periodic force impulse in any given radial direction, and the coupling of this bearing means to a vibratory device having a resonant frequency range whereby said periodic force impulse is effective to vibrate said device in said range. To this end, the rotor is driven at an orbital frequency which generates a vibration frequency in the range of resonance for the driven vibratory device. I have discovered that the driven vibratory device, when so vibrating in its resonance range, with its vibration amplified by resonance, back-reacts with the orbital rotor, strongly constraining the rotor to an orbital periodicity corresponding to its own resonant frequency. I have further discovered that the apparatus tends inherently to operate on the low side of the frequency for peak resonant amplitude, and further, that the whole apparatus, driven vibratory device and orbiting rotor, tends to lock in synchronously slightly below the frequency for peak resonant amplitude. The orbiting rotor is strongly constrained to produce this frequency, and although it could of course be strongly enough driven to reach a threshold condition where it would reach and break over peak amplitude resonance frequency, considerable increase in driving effort is required before this unwanted condition occurs. In this connection, it is to be understood that the driving effort on the rotor is limited to a value below such threshold condition. The rotor is hence guarded from over-speeding and destroying itself or its housing when operated at high frequency.

In addition to these effects, the constraint which keeps the frequency of the orbiting rotor to the low side of the resonance curve (amplitude vs. frequency) of the vibratory driven device is effective to establish a phase angle between the rotor motion and the motion of the vibrating device wherein optimum power is delivered from the rotor to the vibrating device for a given power input to the rotor.

It will be evident that such an orbiting rotor generator has high output impedance, while being operable by motive power at low impedance, impedance being understood to be proportional to the ratio of force to velocity. Considering the output side of the generator, where the race for the orbiting rotor is coupled to the vibratory driven device, it will be seen that the cyclic force amplitude will be high owing to the high magnitude of centrifugal force, while the stroke amplitude, and therefore the velocity amplitude, will obviously be low. The desirable high output impedance for the resonant system is therefore attained. Impedance is generally thought of in connection with alternating phenomena such as alternating forces, in comparison with resulting velocity amplitude. The motive power source used in the present instance is typically a unidirection drive motor rather than an alternating entity. Nevertheless, the typical motor has the characteristic of relatively low force and relatively high velocity, and is, broadly speaking, a form of power having a "low impedance" quality. The generator of the invention thus fulfills the requirement of operating off a low impedance form of power, and delivering power at high impedance.

The illustrative embodiments chosen for disclosure herein are for the most part of the type wherein the resonantly driven device is of the distributed constant type, though without implied limitation thereto. It should be explained that a "distributed constant" system is one wherein the parameters of mass and elasticity governing the resonant vibration frequency are distributed throughout all or a significant part of the vibratory system, as in the ideal example of a turning fork. By contrast, a "lumped constant" system is one wherein the parameters of mass and elasticity governing the resonant frequency are largely concentrated or localized in discrete elements such as intercoupled masses and springs, respectively. Of course, these are idealized classifications. Practical systems usually are mixtures of the two. Thus, practical systems wherein the parameters of mass and elasticity are preponderantly "distributed" will also very commonly have local concentrations of mass, with small capability for elastic vibration therein; while practical systems wherein mass and elasticity are preponderantly localized, as in intercoupled spring and mass elements, will invariably have certain "distributed constant" qualities in view of mass inherently present in spring elements, and elasticity inherently present in mass elements. Thus, the resonantly driven devices of the invention may embody such distributed constant elements as an elastic bar, in which either transverse, gyratory, or longitudinal standing wave action may be set up by the vibration generator. Such bar may be a solid rod, or it may be tubular, as a steel pipe. The term "bar" is often used in the field of acoustics in connection with discussions of elastic wave progagation, without reference to the cross-sectional form of the "bar," and the term will be so used herein, both in the specification and claims, thus generically comprehending hollow rods, or pipes, as well as solid rods, I-beams, and other structural shapes.

The present invention concerns my discovery that a resonantly vibratory body, device or system, such as an elongated elastic bar, composed for example of steel, will contribute unexpectedly firm frequency stability to a rotary drive oscillator if the latter has a frequency step-up feature. Assume that the drive motor for the oscillator or vibration generator is an induction motor, or a fluid drive motor such as an air or hydraulic motor. It is of course well known that close speed control of such motors is very difficult of accomplishment. Certain rotary oscillators or vibration generators have an inherent frequency step-up. For example, though without limitation, the generator may comprise a roller rolling around the inside of a circular bearing or a raceway, the roller generally being relatively large as compared to the inside diameter of the raceway and having a typical diameter of the order, for example, of three-quarters the diameter of the raceway. A centrifugal force is thereby exerted by the roller on the raceway, with a periodic force impulse component in any given direction. For simple example, the roller may be assumed to be rotated through a flexible drive shaft, and to have sufficient traction with the raceway that it rolls therearound, the flexibility in the shaft accommodating the action. A little reflection will show that, for a roller or rotor whose diameter is a large fraction of the bore or raceway in which it works, the roller will roll many times around the bearing surface for each revolution of the drive shaft. Thus the vibration imparted to the bearing and vibratory system acoustically coupled thereto will be at correspondingly higher frequency than the rotation frequency of the drive shaft. Then assume further that the flexible drive shaft is driven by a conventional induction motor. Now, in accordance with the invention, the induction motor is driven at such a speed as will, with the frequency step-up feature taken into account, cause a vibration of the bearing means and resonantly vibratory member or system coupled thereto as will set the latter into vibration (resonant standing wave of resonant bodily vibration) in the resonant frequency range. Now, because, as explained hereinabove, a vibratory device vibrating at resonance exerts a back reaction or feedback control effect on such a rotary oscillator, the oscillator tends to vibrate with good frequency stability. Finally, because this resonance feedback effect holds the oscillator to a closely controlled frequency, the drive motor for the oscillator is also held at a closely controlled frequency. For example, assume an induction motor which ordinarily tends to wander up and down through a fairly wide speed range when working into typical loads, such as typically from 1725 to 1775 r.p.m. Such a motor in the present combination and with the resonantly derived control effect can be held to a variation of only a few r.p.m., or even a fraction of one r.p.m. The invention thus makes possible the generation of powerful elastic vibration frequencies with powerful, simple, reliable and economic power sources such as induction motors, fluid motors and the like, with full assurance that the output frequency of the vibrations delivered will be held within close limits.

In further explanation of the foregoing phenomena, the frequency step-up feature will be seen to give the elastically resonant vibratory member a kind of "mechanical advantage" in its feedback "hold" on or control over the drive motor. The situation is nearly analogous to a transmission gearing arrangement, where back-torque reaction of the load has a mechanical advantage against the slower running prime mover. The analogy is not actually complete, since the present system has the somewhat sophisticated additional characteristic that the control effect is owing to a manifestation of resonance in an elastically vibratory system.

The drawings show several illustrative embodiments of the invention which will now be described in detail. All of these embodiments have the frequency step-up feature discussed hereinabove, but one embodiment has a design capability for frequency step-down for any applications where such a feature may be useful.

Figure 1:
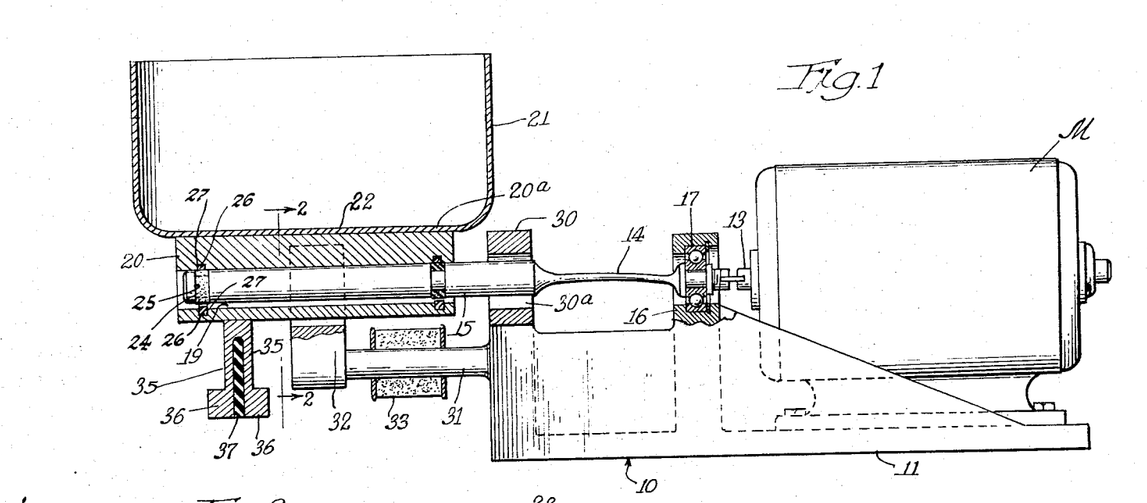
FIG. 1 is a side elevation, partly in medial longitudinal section, showing an illustrative embodiment of the invention.
Figure 2:
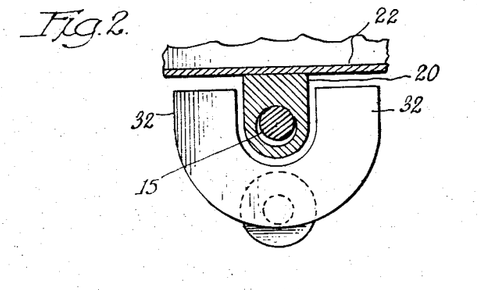
FIG. 2 is a section taken on line 2—2 of FIG. 1.
Figure 3:
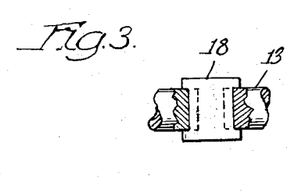
FIG. 3 is a detail showing a shaft key used in the embodiment of FIG. 1.

FIGS. 1–3 show an embodiment of the invention, powered, illustratively in this case, by an electric motor M which is shaft-coupled to the rotor. The motor is typically an induction motor. Provision is made, particularly for starting purposes, for improving traction between the rotor and its race by insert friction rings, or by magnetic forces, or both. Also, in this case, the generator is illustrated as driving a resonant load which may comprise a vibratory system in which the parameters of mass and elasticity are largely concentrated or localized, such as to behave largely as a lumped constant system, as explained hereinabove.

Numeral 10 designates generally a base frame, composed of a low reluctance material such as cast iron or steel. Frame 10 has a base 11 adapted to be secured down to any suitable foundation, not shown. It mounts at one end the electric drive motor M, for example, a common induction motor, whose shaft 13 is coupled to one end of a quill shaft 14, formed on the end of a relatively long, cylindrical rotor 15. Quill shaft 14 is relatively slender and somewhat flexible, so as to accommodate elastic bending. Frame 10 includes a support 16 for a bearing 17 journalling the end portion of shaft 14 opposite from rotor 15. A suitable coupling between motor shaft 13 and the adjacent end of shaft 14 is shown in FIGS. 1 and 2 and may comprise a key 18 of generally H-shape, engaging in notches in the ends of shafts 13 and 14.

Cylindrical rotor 15 is received, with a degree of clearance such as indicated in FIGS. 1 and 2, within a bore 19 extending longitudinally through a somewhat elongated rotor race block 20, of generally semi-cylindrical shape in cross-section, affording a flat upper side 20a to which the work load may be secured. In this instance, the work load comprises a tub or tank 21, having preferably an elastically vibratory bottom wall 22 connected as by silver soldering to the upper face of member 20. The inside surface of bore 19 furnishes a circular race for rotor 15.

Tank 21 and rotor race 20 may be provided with any suitable means of support, not shown, capable of both supporting said members, and accommodating the vibratory action thereof. Since it is desired that the mass of member 20 and the vibratory portion of tub 21 be a portion of a resonant vibratory system, an elastically vibratory means is required; and this elastically vibratory means may comprise the elastically vibratory bottom wall of the tub, contents, or may comprise a spring means incorporated in the support for the member 20 and the tub 21. In the latter two cases, the tub, of course, need not have an elastically vibratory bottom, and functions primarily as lumped mass. In the former, the tub, having both substantial mass and substantial capability for elastic vibration, actually has certain distributed constant character.

In operation, rotor 15 rolls around the periphery of bore 19 with a gyrating motion. In order to improve traction between the rotor and the surface 19, particularly for starting, friction rings such as indicated at 24 are set into annular grooves 25 formed in bore 19, and as here shown, overlying friction rings 26 are also provided in annular grooves 27 around rotor 15. These friction rings can be cork, compressible rubber, or the like. They protrude only slightly above the surfaces into which they are set; and when the rotor 15 is up to speed, the centrifugal force exerted thereby is sufficient that these friction rings compress back out of the way and permit full metal-to-metal contact between the rotor and the surface of bore 19. Such friction rings provide relatively high sliding friction so as to afford good traction for starting. They contribute immaterial rolling friction, however, particularly when the rotor is somewhat up in speed, since the rolling bearing load is assumed primarily by the hard metal surface of the bearing race.

A little consideration will show that, for a rotor whose diameter is a large fraction of the bore in which it works, the rotor will roll many times around the bearing surface 19 for each revolution of the drive shaft. Vibration-inducing force impulses are thereby exerted on the bearing and the driven vibrating system coupled thereto.

A very desirable frequency step-up feature is thereby attained. It will also be appreciated that quill shaft 14, being slender and somewhat flexible, continually bends as the rotor 15 rolls around its race 19, permitting roller 15 to be in rolling engagement with race 19, while at the same time the remote end of shaft 14, where supported by bearing 16, retains a fixed axial position, such that no gyrational vibration is transmitted to the motor.

The resonant frequency of the driven system is determined by the mass of the vibrating parts, including that of member 20, and the vibrating portion of tank 21 and its liquid body content, and also by the elastic stiffness of the vibratory bottom portion of the tank, or of the tank supporting means, resonance being obtained, of course, at that frequency at which mass reactance is equal in dynamic effect to elastic stiffness reactance. The equipment is so designed that motor M will drive rotor 15 at a number of revolutions per second at which the rotor rolls around race 19 at a frequency which is in the range of the resonant frequency of the vibratorily driven system. As this resonance frequency is reached, the vibrating driven system back-reacts through shaft 14 on the drive motor M to hold its speed on the low side of the resonance curve, as described in the introductory part of this specification. Motor M may be an induction motor whose rotor has a capability of "slip" in its rotating field, and is then subject to being controlled to run at the resonant frequency of the driven system. As a matter of fact, the induction motor runs under a degree of speed control as a result of the back reaction of, or feedback effect from, the resonantly vibrating system; but this speed control becomes closely monitored, and controlled within narrow limits, and therefore of greatly increased effectiveness, by reason of the frequency step-up feature from the motor driven oscillator rotor to the resonantly vibrating system, as described earlier. In this connection, the resonantly vibratory system, vibrating at stepped up frequency, has a kind of mechanical advantage over the motor, and holds it within much closer speed variation limits than the motor would experience under ordinary conditions. A novel consequence of the system is thus improved speed control or stability of the motor, and therefore improved frequency stability of the vibrating system. The rotor 15 rolling around race 19, sets the member 20, and the bottom wall of tank 21, into gyratory vibration, but usually with a major degree of vibration in one axis. Each point of member 20, and of the resilient tank bottom describes a small circle, or ellipse, owing to the centrifugal force exerted on race 19 during each trip or circuit of rotor 15 around the race. The amplitude of this gyration, i.e., the diameter of the small circle, increases greatly at the resonant frequency, and the system uniquely locks in at resonance, as described hereinabove.

Friction rings contributing traction between the rotor and its race have already been described, and have been stated to be useful particularly during starting. An alternative means for improving traction will next be described. Frame 10 includes a ring-shaped magnetic yoke 30 surrounding and annularly spaced by a small air gap 30a from one extremity of rotor 15. An arm 31 extends from frame 10, immediately adjacent to ring 30, and is formed at its free end with yoke arms 32 extending closely about race member 20. Thus, there is a magnetic flux path through arm 31 between ring 30 and yoke arms 32. This flux path extends from yoke arms 32 through a narrow air gap to race member 20, which should also be composed of a low reluctance material, and will ordinarily be hardened steel. The flux so fed from yoke arms 32 to member 20 passes through rotor 15, and finally back to ring 30 and frame 10 via air gap 30a. Energization of coil 33 accordingly results in rotor 15 being attracted to the wall surface 19 of member 20. The rotor is thus held in good frictional contact with the race, and it will be evident that this is true no matter where the rotor is in its path around the race. This bias of the rotor against the race contributes material traction between the rotor and its race, and is a very desirable feature particularly at starting. It should be understood that in a machine of the present type, where there is a large frequency step-up between the driving torque and the rolling contact frequency, a tendency is observed for the rotor simply to roll up the side of the race and then slip thereagainst when the driving power is first applied. The magnetic traction means described, which is preferably in use only at time of starting, holds the rotor tightly against the race, so that adequate driving traction is obtained. It is generally desirable to utilize the magnetic flux for added traction only during starting, since once the machine is well up in speed, centrifugal force is great enough to assure necessary traction. Suitable switching means for this purpose will be within the skill of the art and need not be shown.

The apparatus of FIGS. 1–3 is also preferably equipped with a damping means, generally designated by the numeral 30, designed to prevent undersirable vibration patterns. The pattern of principal concern in the present apparatus would result from the possibility of the rotor becoming slightly cocked in its race so that the two ends gyrate with their contact points relatively displaced in angular position. Such a wobbling mode would cause the bearing race to project a rocking vibration into the work load, which is generally undesirable, especially in cases of radiating sound waves into a liquid where a di-pole action is very undesirable.

The damper here shown comprises a pair of fairly limber elastic reed members 35 depending from race block 20, each terminating at its free extremity in an enlarged mass 36. The reed members 35 may be formed by longitudinally slotting a generally T-shaped bar of the proportions illustrated. In the slot between the member 35 is placed a body 37 of viscous material such as tar, pitch, etc. In the event that the race member 20 should tend to vibrate in a "rocking mode," as a result, for example, of the rotor running slightly cocked in the race, the reeds 35 tend to bend, and such bending sets up a viscous shearing action within the damping material 37. Such damping action restrains bending of the reeds, and in turn imposes a restraint on the undesired rocking mode of the race member 20.

Figures 4, 4A, 5:
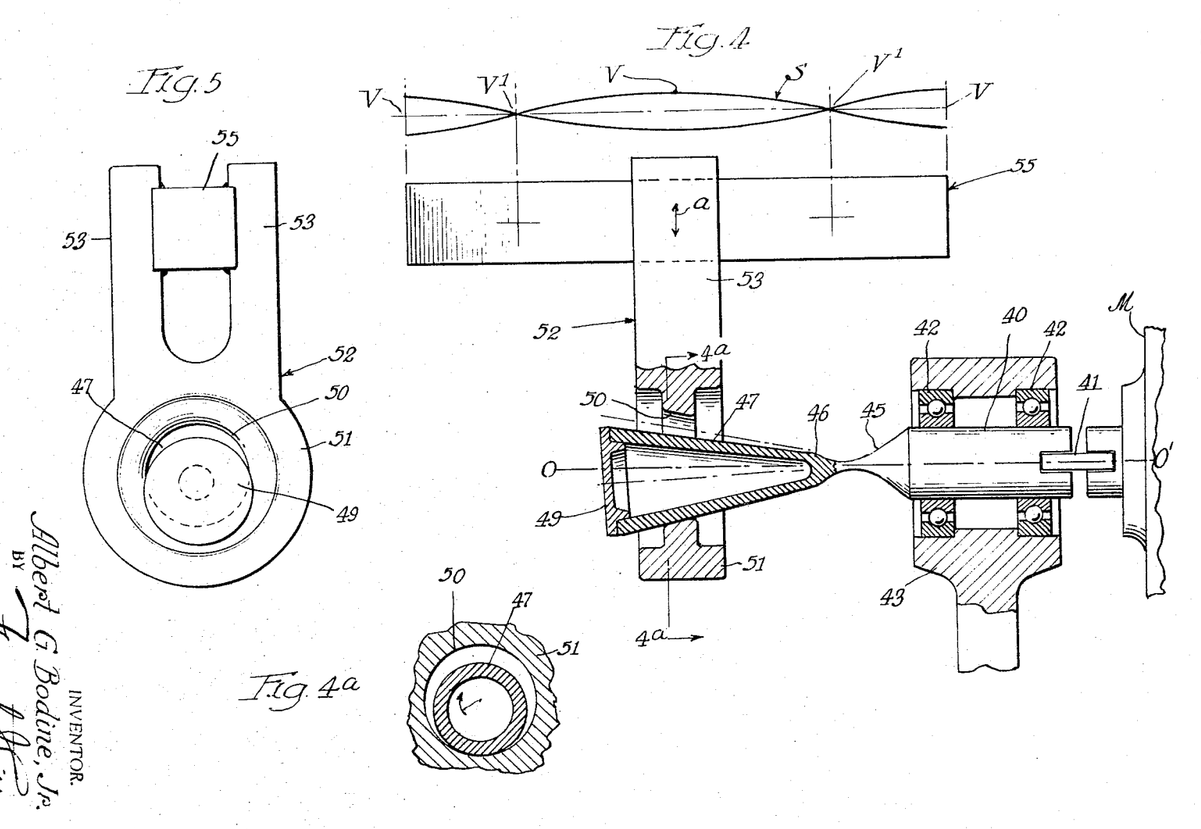
FIG. 4 is a side elevational view, with parts in medial section, showing another embodiment of the invention.
FIG. 4a is a detail section taken on line 4a—4a of FIG. 4.
FIG. 5 is an end elevational view of the device of FIG. 4.

Reference is next directed to FIGS. 4, 4a and 5, showing a modified form of the invention using a different form of roller and bearing element, and an arrangement wherein the flexing of the drive shaft is less severe and demanding. This embodiment shows also a different type of resonantly vibratory load driven by the vibration generator. It will be understood, however, that the speed control exerted by the resonantly vibratory driven device or system over the drive motor is substantially the same as that obtained in FIGS. 1–3.

A drive motor, again typically an induction motor, is fragmentarily designated at M, and drives rotor shaft 40 through the motor drive shaft and a coupling key 41. The rotor shaft 40 is supported in bearings 42 carried in a suitable support 43 mounted on any steady base, not shown. To the left of bearing support 43, as viewed in FIG. 4, the rotor shaft 40 has a gradual reduction in diameter, as at 45, to a region 46 of minimum diameter and maximum elastic flexibility, while to the left of region 46 the rotor shaft flares in the preferred form of a cone, as indicated at 47. The cone 47 is preferably hollow from near the minimum section 46 to the large end of the cone, for purpose of holding the mass of the cone within reasonable limits, and the end of the cone may be closed by a closure plate such as indicated at 49 which may be fastened in place by low temperature brazing. The conical portion 47 of rotor shaft 40 is normally, or in the undeformed position thereof, centered or symmetrically disposed on the longitudinal rotational axis O–O' of the system. In FIG. 4, however, the conical portion 47 of the shaft is shown as deflected angularly downward about the minimized section 46 as a bending region. The conical portion of the shaft is thus elastically deformed into this downwardly deflected position as illustrated in the figure, and such elastic deformation will be later understood as arising from the influence of centrifugal force as the rotor shaft is rotated by motor M.

The conical shaft member 47 is disposed inside a conical raceway surface 50 formed in the head portion 51 of a yoke generally indicated by numeral 52. As illustrated, the conical surface 50 conforms to the angle of the conical portion 47 of the shaft when the shaft is elastically deformed sufficiently to bear on the surface 50. In operation, the conical rotor portion 47 rolls around the conical seat 50 when driven by drive motor M. By virtue of centrifugal force, the rotor bears against the raceway surface 50, and exerts thereon, as will be seen, a rotating force vector. It will, of course, be appreciated that the conical rotor will tend to deflect in one direction or another as the rotor is brought up to speed, any slight imbalance in the rotor with respect to the axis O–O' being effective to throw the conical rotor into off-center position, whereby it comes into engagement with the confining conical bearing surface 50, and then travels thereabout by rolling contact. Here again, as in the earlier embodiment, the contact point of the rolling member makes a number of revolutions while the drive motor and the rotor shaft itself makes a single revolution, thus accomplishing a frequency step-up effect.

The bearing surface 50 is on a yoke member 52, as mentioned hereinabove. Between the yoke arms 53 is rigidly mounted the center point or portion of the elastically vibratory member 55 which is to be driven at its resonant frequency. In this case, the member 55 comprises a rectangular elastic beam, composed of steel or similarly good elastic material. In the illustrative embodiment, the purpose is to set up in the elastic beam 55 a full-wavelength, lateral mode of resonant standing wave vibration, at the natural standing wave frequency of the beam 55, and such a standing wave is indicated at S in FIG. 4, where the width of the diagram at any point along its length represents the vibration amplitude of the corresponding point on the beam. The standing wave S will be seen to have, as is usual in full-wavelength standing waves, velocity antinodes V at the two ends, a velocity antinode V at the center, and velocity nodes V' one-quarter of the length of the beam inwardly from each of the ends thereof. Such a vibratory member constitutes a distributed constant vibratory system, and is best set into resonant frequency vibration by applying to it, at one of its velocity antinodes, a periodic vibratory force in the resonant frequency range of the beam. The yoke 52, receiving gyratory force impulses from the rotating conical rotor member 47, transmits such force impulses via the yoke 53 to the beam 55, and it will be clear that the components such force impulses direct toward and from the beam 55 are exerted on the beam at its middle velocity antinode, as indicated by the double-headed arrow $a$ in FIG. 4. When these force impulses are in the resonant frequency range of the beam, the beam is set into resonant standing wave operation, as represented by the diagram S.

As is the case with the embodiment of FIGS. 1–3, a back reaction from the resonantly vibratory device, here the beam 55, acts with the aid of frequency step-up to speed-control the motor-driving means.

Figure 6:
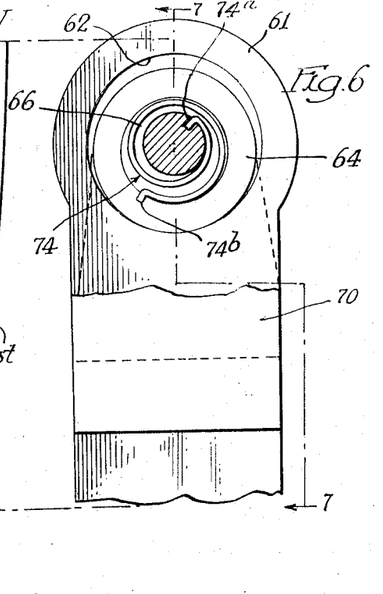
FIG. 6 is an end elevational view of a further modified form of the invention.
Figure 7:
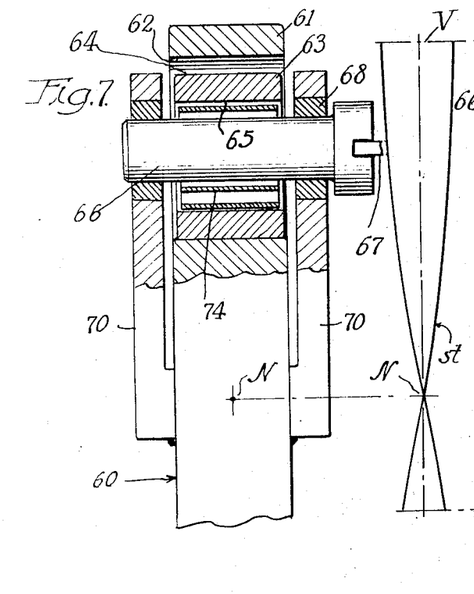
FIG. 7 is a view taken in accordance with the broken line 7—7 on FIG. 6.

FIGS. 6 and 7 show another embodiment of the invention, with a modified form of elastic torque transmitting means between the drive shaft and the inertia rotor. The vibratory device to be driven in its resonant frequency range is again in this case an extended elastic bar or beam, generally designated at 60, but only fragmentarily shown in the drawings. Actually, a little more than the upper quarter of the beam 60 appears in the drawing.

This beam 60 has at its upper extremity an enlarged head portion 61 formed with a transverse bore 62 serving as a raceway for a presently described inertia rotor. The inertia rotor is designated generally at 63, and comprises a hollow cylinder having an outside peripheral surface 64 adapted to roll around the inside of bearing surface 62, and an internal bore 65. A drive shaft 66 projects coaxially through the bore 62 in bore 60, having a somewhat lesser diameter than the interior diameter of the cylindrical inertia rotor 64, in proportions such as typically shown. The drive shaft 66 will be understood to be driven from a suitable drive motor, such as an induction motor, through a coupling means such as 67 from the drive shaft of such motor, the motor not appearing in FIGS. 6 and 7 and being understood to be provided for example in the typical and preferred arrangement suggested in FIG. 4. Shaft 66 is journalled in bushings 68 mounted in bracket arms 70 which extend downwardly along the sides of the upper end portion of the bar 60, and are connected to the latter, as by welding, in the region of the upper velocity node N of the standing wave pattern set up in the bar 60. The partial standing wave diagram st in FIG. 6 shows the resonant wave pattern in the upper end portion of the bar 60, and shows that there is a node N of the wave st at approximately one-quarter of a wavelength of the bar downwardly from its upper extremity. A velocity antinode V occurs at the upper extremity of the bar. Since the nodal region N is a region of minimized vibration amplitude, the bracket arms 70 are supported from a portion of the bar 60 which stands nearly or substantially stationary. The shaft 66 thus is afforded bearing support in substantially stationary bearing elements, so that the shaft 66 remains in good alignment with the drive motor (not shown) for the shaft 66.

A flexible or elastic interconnecting element is provided between the drive shaft 66 and the inertia rotor 64, and in this typical instance comprises a flat coil spring 74, having one extremity 74a set tightly into drive shaft 66, and one extremity 74b set tightly into the interior of the inertia ring 64. Driving torque from the drive shaft 56, driven by the drive motor, is thus transmitted to the inertia rotor 54 through the flexible or elastic spring member 74. The latter is thereby caused to roll around the inside of the bearing surface 52, substantially in the manner of the embodiment of FIGS. 1–3, with similar transmission of gyratory force, combined with frequency step-up, to the upper end extremity 61 of the bar 60. It will, of course, be understood by those versed in the science of acoustics that the upper end extremity of an elastic, elongated bar is a desirable location for setting up in the bar a mode of elastic, resonant standing wave vibration. The systems of FIG. 7 or 8 could actually be used to set up in the bar 60 either a longitudinal standing wave, or a lateral standing wave, but the latter is assumed for present purposes. Accordingly, the shaft 66 is driven by the drive motor at a speed to accomplish, through the step-up in frequency arising out of the rolling action of the rotor 54 around the raceway 62, a component of cyclic force impulse applied laterally against the upper end portion of the bar in the resonant frequency range of the bar for its lateral mode of resonant standing wave vibration. The lateral mode of standing wave vibration will then be emphasized and amplified. Since the cyclic frequency will in this case be substantially removed from the resonant frequency of the bar for longitudinally vibration, there will be no resonant amplification of vibration in the longitudinal direction, and vibration in that direction may be neglected for present purposes. The drive motor is again affectively speed-controlled through a frequency step-down characteristic from a back reaction or feedback from the resonantly vibrating bar.

Figure 8:
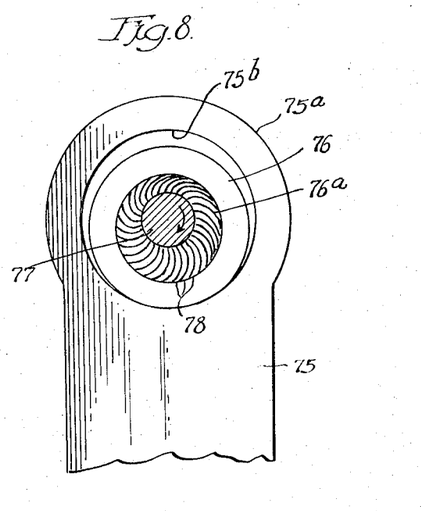
FIG. 8 is a view similar to FIG. 6 but showing still another modification.

FIG. 8 shows one further illustrative embodiment of the invention, showing only a fragmentary upper end portion of an elastic bar which may be assumed to be a bar capable of resonant standing wave vibration, either in the lateral or the longitudinal mode. The elastic bar is in this instance designated generally by the numeral 75, and may be very much like the bar 60 of FIGS. 6 and 7, having at the upper end portion thereof a somewhat enlarged head portion 75a, formed with a circular opening providing a raceway 75b for a cylindric inertia rotor 76. The latter has an internal bore 76a, and arranged for projection through raceway 75b on the axis of the latter is drive shaft 77, understood to be driven from a suitable drive motor, such as an induction motor or a fluid motor, not shown. This shaft 77 may be provided with any suitable bearing means, supported externally of the vibratory system, if desired, or as in FIGS. 6 and 7. In place of the spiral or coil spring 74 of the embodiment of FIGS. 6 and 7, there are employed in the embodiment of FIG. 8 a plurality of elastic bristles 78, which extend from the shaft 77 and drivingly engage against the interior of the rotor 76. These bristles can be fine steel wires, silver soldered to the rotating shaft. The outside peripheries of these bristles bear frictionally upon the inside of the gyrating rotor 76. Preferably, in order to improve the friction factor, the bristles have a length substantially greater than the radial spacing between the shaft 77 and the interior surface of the hollow cylinder 76 when the latter is centered with the shaft. The flexible and elastic bristles 78 thus function to transmit driving torque from the shaft 77 to the rotor 76, so as to cause the latter to roll around the inside of the bearing surface 75b in the bar 75, and thus, assuming drive of the shaft 77 by its motor in the resonant frequency range of the bar 75, accomplishing resonant standing wave vibration of the bar 75 in a selected resonant standing wave mode. A back reaction effect from the resonantly vibrating bar 75, such as obtained with the earlier embodiments of the invention, aided by frequency step-down, operates here also, being transmitted back through the bearing surface of raceway 75b, the gyratory inertia ring 76, and the bristles 78 to the shaft 77 and its drive motor to hold the latter within closely controlled speed limits corresponding to the resonant frequency of the vibratory bar 75.

The embodiments shown in FIGS. 9–15 are geared oscillators with axial input drive which may be made in two general types, and each type may be arranged in four distinct configurations. Type No. 1 is a low-ratio design in which the frequency of vibration relative to the input shaft rotation varies, within practical limitations of gear size and design, from about 1 to 5 step-down to 5 to 1 step-up. Type No. 2 is a high-ratio design in which the frequency of vibration relative to the input shaft rotation varies from about 2 to 1 step-up to a theoretical infinite step-up, this also being limited by practical gear design.

Oscillators of the kind discussed herein have either a roller running inside a circular race, or a ring whirling about a central, circular pin. There are two roller and two whirling-ring configurations in each type, a total of eight. The basic difference between the two types is that in the first, low-ratio design, such as shown in FIGS. 9–12 hereof, the driving force is applied to the ring or roller at a point opposite the point of contact of the ring or roller with its race, and in the second, high-ratio design, such as shown in FIGS. 13–15 hereof, the driving force is applied at a point on the same side of the center of the oscillator race as the point of contact of the ring or roller with that race. In both types the total gearing consists of two sets of spur and internal gears, one set having the pitch diameter of the race and roller or pin and ring, as the case may be, and the other having a choice in size, depending upon the vibration-to-drive ratio desired, but limited, because of the geometry of the system to a difference in pitch diameter equal to that of the race and roller (or ring) gear set $r_1$ = race (or pin) gear radius
$r_2$ = roller (or ring) gear radius
$r_3$ = roller (or ring) drive gear radius
$r_4$ = input gear radius
$S$ = ratio between roller (or ring) trips around the race (or pin) and one input gear rotation. A negative value indicates that the direction of rolling on the race (or pin) is in the opposite direction to the motion of the drive gear. Variations in S for a given set of values of $r$ in the eight configurations are shown.

For Type No. 1 oscillators, $S_1$ in terms of the four radii is:

$$S_1 = \frac{r_2 r_4}{r_2 r_4 - r_1 r_3} = \frac{1}{1 - \frac{r_1 r_3}{r_2 r_4}}$$

This may, however, also be expressed in terms of the ratio, G, between the roller trips around its race, and one roller rotation, or the equivalent spur and internal gear set. There are two gear sets involved, represented by the gear radii $r_1$ and $r_2$, and $r_3$ and $r_4$, respectively. Hence, with appropriate subscripts, $$G_{12} = \frac{1}{1 - \frac{r_1}{r_2}} = \frac{r_2}{r_2 - r_1}$$

for race and roller, or pin and ring, $$G_{34} = \frac{1}{1 - \frac{r_3}{r_4}} = \frac{r_4}{r_4 - r_3}$$

for roller drive gear and input gear, or ring drive gear input gear.

We have then that $$S_1 = \frac{G_{12} G_{34}}{G_{12} + G_{34} - 1}$$

For Type No. 2 oscillators, $S_2$ in terms of the four radii is:

$$S_2 = \frac{r_2 r_4}{(r_2 - r_1)(r_4 - r_1)}$$

and this may also be expressed in terms of the individual gear set ratios G except that whereas $$G_{12} = \frac{1}{1 - \frac{r_1}{r_2}} = \frac{r_2}{r_2 - r_1}$$

is the same race and roller set as before, we have $$G_{14} = \frac{1}{1 - \frac{r_1}{r_4}} = \frac{r_4}{r_4 - r_1}$$

is the ratio between the race (or pin) and the input drive gear (spur or internal) and these do not run together, as a set and are not, therefore, limited by practical considerations of meshing gears. When $r_1$ and $r_4$ approach the same size the step-up ratio becomes infinite. We have then that $$S_2 = G_{12} G_{14}$$

For either type of oscillator, if S is known, the input drive gears can be selected only after the race and roller sizes have been determined, and this requires some consideration of the specific oscillator application. The maximum impulse from a given roller is obtained when $$r_2 = \frac{2}{3} r_1$$

but it is generally desirable to keep the angular velocity of the roller in the race as uniform as possible to keep the output as neary sinusoidal as possible, and for this reason the roller may preferably be made heavier by increasing its radius as well as its length. The increase of radius reduces the value of D, where $$D = r_1 - r_2 = r_3 - r_4$$

and this in turn affects the final gear selection, because with standard gears, the minimum D is given by $$2D = 8/P$$

where $P$ = diametral pitch of the gears selected. When the desired impulse M of the oscillator is known, where $M = 2.84 \times 10^{-5} WDn^2$ where $W$ = weight of roller in pounds
$n$ = roller trips around race per minute and the values of $r_1$ and $r_2$ have been selected together with a value of D that will give a gear that will transmit the H.P. requirements of the oscillator, then we may calculate the size of the input gears from the relations $$r_4 = \frac{S_1 r_1}{G_{12} - S_1}$$

$$r_3 = r_4 - \frac{r_2}{G_{12}}$$

for Type No. 1 oscillators. These may not turn out to fit the selected gear pitch, so we start with the smallest gear (unless this is already $r_1$ or $r_2$) and take the relations $$\frac{r_2}{r_4} = \frac{G_{12}}{G_{34}}$$

and $$r_4 = \frac{-8}{2P} G_{34}$$

and work back, to determine $r_1$ and $r_3$ after $r_4$ and $r_2$ are selected. In the event that a finer pitch gear is selected than that which gives an eight-tooth difference for the smallest internal gear set, more latitude in design is possible. In any event, after the four radii are selected, the final value of $S_1$ can be calculated from these. It is difficult, and sometimes impractical, to obtain a particular value of S, but a combination can always be found that approaches it.

It is of interest to note that for Type No. 1 designs, when $S_1 = -1$ (a one-to-one ratio) that $$G_{12} = \frac{1 - G_{34}}{1 + G_{34}} \text{ or in general}$$

$$G_{12} = \frac{S_1(1 - G_{34})}{S_1 - G_{34}}$$

For Type No. 2 (high ratio) designs the corresponding equations are $$G_{12} = \frac{1}{1 - \frac{r_1}{r_2}} = \frac{r_2}{r_2 - r_1}$$

$$G_{14} = \frac{1}{1 - \frac{r_1}{r_4}} = \frac{r_4}{r_4 - r_1}$$

$$S_2 = G_{12} G_{14} = \frac{r_2 r_4}{(r_2 - r_1)(r_4 - r_1)}$$

$$r_4 = \frac{S_2 r_1}{S_2 - G_{12}}$$

$$r_3 = r_4 + \frac{r_2}{G_{12}}$$

$$\frac{r_2}{r_4} = \frac{G_{12}}{G_{34}}$$

$$r_4 = \frac{-8}{2P} G_{34}$$

The present discussion is concerned only with the selection of relative gear sizes of the race, roller, roller gear and input drive gear to give definite vibration-to-drive ratios. There are, however, a variety of ways in which these gears may be arranged in a particular oscillator and these include, in the case of race and roller types, at least three styles:

Style (a) The power to drive the roller is put in at the ends of the roller, and the roller may be solid.

Style (b) The power to drive the roller is put into the roller (which is hollow) at the center, or about its center from a shaft which passes through the roller.

Style (c) The power to drive the roller is put into the roller (which may be solid) at its center or about its center but at its periphery, by means of an internal gear which surrounds the roller and is coaxial with the race.

Similar variations are possible with the ring and pin types except that the rings are, by necessity, always hollow.

Figure 9:
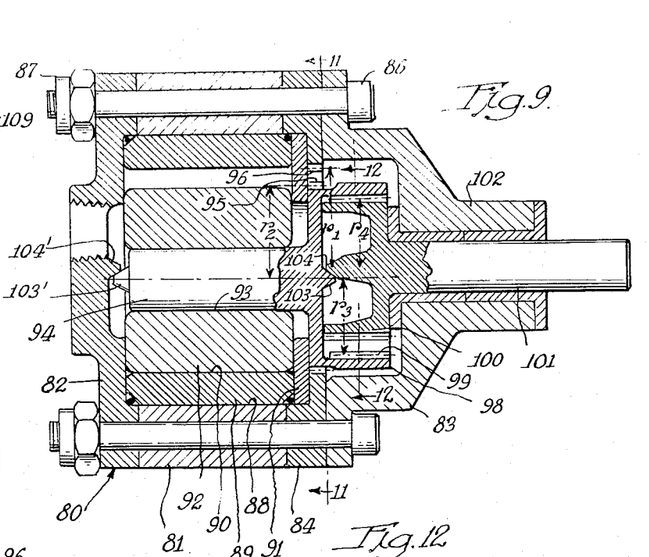
FIG. 9 is a longitudinal medial section through another embodiment of the invention.
Figure 10:
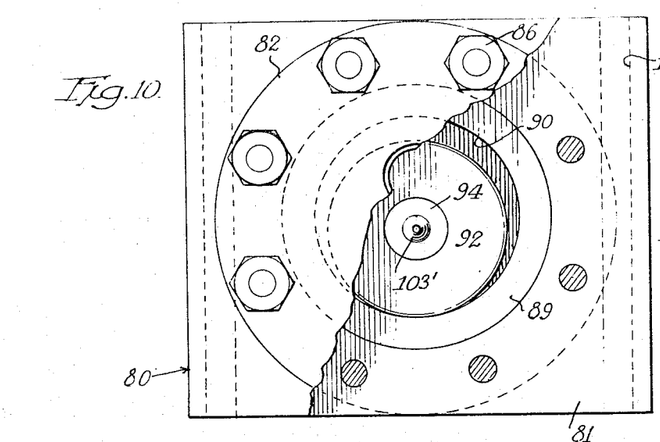
FIG. 10 is an end elevation, looking toward the right, in FIG. 9.

FIGS. 9–12 show a present practical form of generator in accordance with the invention, being of Type No. 1 of the immediately foregoing discussion, and being further characterized by having a roller running inside a circular race. The generator has a housing 80 made up of an intermediate body member or block 81 and two end caps 82 and 83, together with a spacer member 84 between block 81 and cap 83, said members being typically of rectangular shape as seen in the aspect of FIGS. 9 and 10. The members 81–84 are secured in assembly with one another by bolts 86 and nuts 87. A bore 88 extends through body block 81 and is continued a short distance into end cap 82 and spacer 84, as best seen in FIG. 9. Mounted in this bore 88 is a hardened steel raceway cylinder 89, in which is a cylindrical raceway bore 90. As is shown, a washer 91 is used in spacer 84 at the end of raceway cylinder 89. Mounted in the raceway bore 90 is a hardened steel cylindrical inertia roller 92, of a diameter somewhat less than the internal diameter of raceway bore 90, often in the typical proportions shown in FIG. 9. The roller 92 is adapted to roll around the inside of the bearing surface defining the bore 90, and its ends are relatively closely confined between the washer 91 at one end and the inside face of cap 82 at the other. A hardened washer may, of course, be inserted between the ends of the roller 92 and the end cap 82, if desired.

Inertia roller 92 has an axial bore 93 which rotatably receives a shaft or axle 94 projecting axially from a spur gear 95. The roller 92 taken together with shaft 94 and the gear 95 comprise a rotor. The gear 95, which may be termed a phasing gear, has a pitch circle corresponding substantially to the diameter of roller 92. This gear 95 meshes with a stationary internal gear 96, which may be termed a raceway gear, and which is formed in the aforementioned spacer 84. Internal gear has a pitch circle corresponding substantially with the diameter of raceway bore 90.

Projecting axially from spur gear 95 is a cup 98 in which is formed an internal drive gear 99, which meshes with an input spur gear 100 which is on the end of a drive shaft 101 journalled in the hub 102 of end cap 83 coaxially with raceway 90. Input gear 100 will be seen to be of somewhat smaller diameter than drive gear 99, and, in the position of the parts illustrated in FIG. 9, to mesh with internal drive gear 99 at the top. Attention is directed to the fact that in this position, phasing gear 95 is in mesh with raceway gear 96 at the bottom, or in other words, at a point diametrically opposite from the point of meshing of gear 99 with gear 100. It will be recalled that this relationship is a characteristic of Type No. 1 generators discussed shortly above. In operation, inertia roller 92 rolls around raceway bearing surface 90, and is held in contact therewith by centrifugal force. While the generator is at rest, or coming up to speed, the roller 92 is maintained in close adjacency to bearing surface 90 by means of interengaging conical axial projections 103 and 104 on the axle 94 and gear 100, respectively, and similarly interengaging projections 103′ and 104′ on the axle 94 and end cap 82, respectively, as clearly shown in FIG. 9.

Attention is directed to the fact that the letters $r_1$ to $r_4$ referred to in the immediately preceding discussion, have been appropriately applied to FIG. 9.

In operation, rotation of drive shaft 101 turns spur gear 100, which, being in engagement with internal drive gear 99, on one side, i.e., at a point of tangency between the two, causes rotation of gear 98. The phasing gear 95 integral with the thus-driven gear 99, then rolls around the inside of stationary internal gear 96 with which it meshes at its point of tangency diametrically opposite from the point of tangency between the gears 99 and 100. Axle 94 and inertia rotor 92 mounted thereon thus gyrate, with the inertia roller 92 rolling around the inside of cylindrical bearing surface 90. As mentioned hereinabove, when the generator is up to speed, centrifugal force developed by the rotation of the roller 92 causes it to bear with considerable pressure against the bearing surface 90. A good non-slipping, rolling engagement is thereby attained. As will appear, the roller 92 rolls around the inside of cylindrical bearing surface 90 substantially in step with the rolling of the spur gear 95 around the internal gear 96. Any tendency for roller 92 to describe this orbital path with a different rate of rotation on its axis from the rotation of the spur gear 95 on the axis of the latter, is accommodated by a slight relative rotation of roller 92 and the axle 94.

The centrifugal force developed by the relatively heavy inertia roller 92 rolling on its orbital path around the inside of bearing or race ring 89, at the raceway surface 90 therein, results in exertion of substantial gyratory force on the generator housing 80. This gyratory force is transmitted from the generator housing to whatever device is to be subjected to this gyratory force. To accommodate securement or coupling of the housing 80 to a device to be subjected to this gyratory output force, the housing 81 may be provided with any suitable facilities, such as drill holes 109 adapted to receive machine screws, not shown. As mentioned hereinabove, the embodiment of generator shown in FIGS. 9–12, as now described in detail, is of the Type No. 1 character defined hereinabove, with drive gear tooth contact on the opposite side of the main longitudinal axis of symmetry of the generator in relation to the point of contact of the phasing gear 95 with the stationary internal gear 91. It will be further noted that the point of driving gear contact between the input gear 100 and the drive gear 99 is diametrically opposite from the point of rolling contact between roller 92 and raceway 90.

Figure 11:
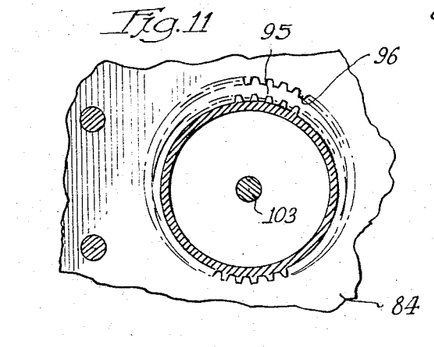
FIG. 11 is a transverse section on line 11—11 of FIG. 9.
Figure 12:
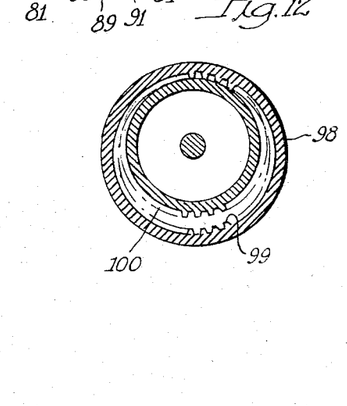
FIG. 12 is a section on line 12—12 of FIG. 9.
Figures 13, 14, 15:
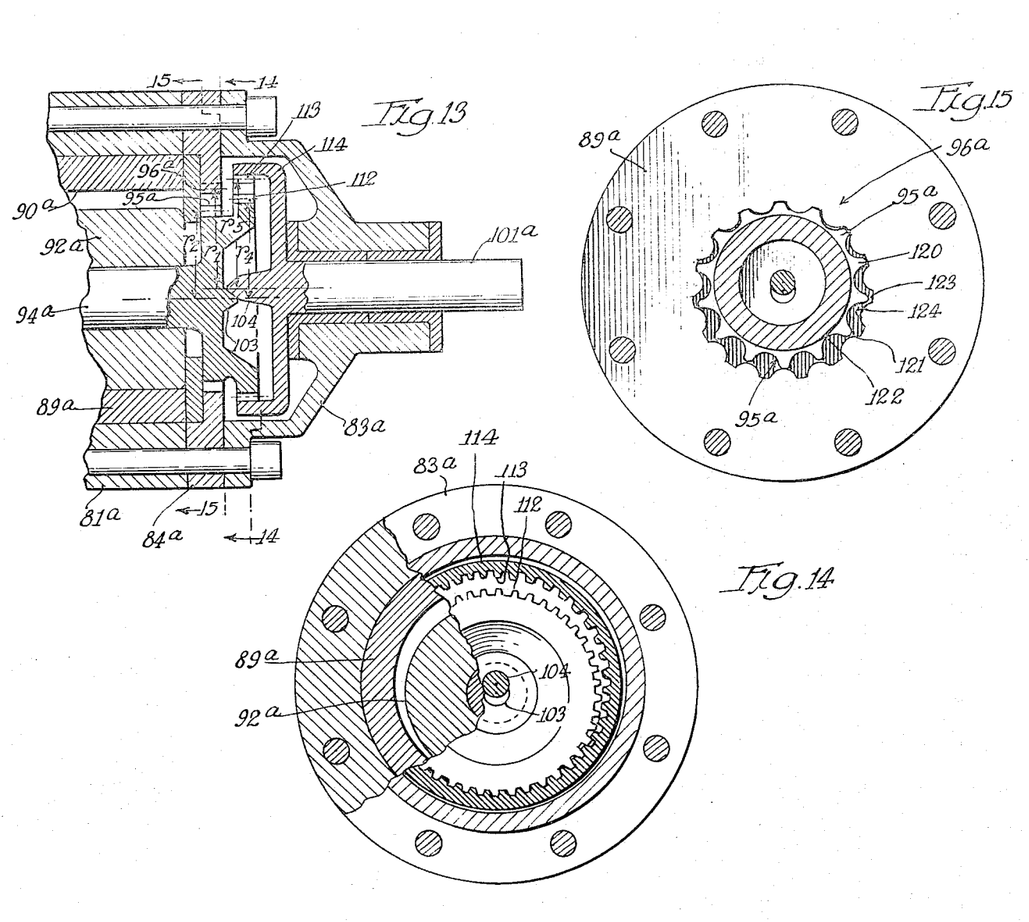
FIG. 13 is a view similar to a portion of FIG. 9 but showing a modification.
FIG. 14 is a transverse section on line 14—14 of FIG. 13.
FIG. 15 is a view taken as indicated by the section line 15—15 of FIG. 13, but showing a modification.

Reference is directed to FIGS. 13 and 14, showing a modification of the generator of FIGS. 10–12. The generator of FIGS. 13 and 14 is in most respects identical with that of FIGS. 10–12, and accordingly, corresponding reference numerals, but with the subscript a added in the case of FIGS. 13 and 14, are applied to corresponding parts. A second description of these corresponding parts will not be necessary and is omitted. In FIGS. 13 and 14, the phasing gear 95a is like the gear 95 of FIGS. 9–12, but instead of carrying a cup with an internal gear, as in FIGS. 9–12, is formed at one side with a coaxial spur drive gear 112. This spur drive gear 112 meshes with an internal input gear 113 in a cup 114 on the extremity of drive shaft 101a.

The generator thus described operates much as does that of FIGS. 9–12, the only essential difference being that in the case of the generator of FIGS. 13 and 14, the mutual point of contact of the drive and input gears 112 and 113, respectively, is on the same side of the longitudinal axis of the generator as the point of contact between the phasing and raceway gears 95a and 96a, respectively, and also, of course, on the same side as the point of contact between the roller 92a and the raceway surface 90a. The result of this difference, as brought forth in the forgoing general discussion of these types of generators, is the capability of an extreme leverage or gear ratio within the gear drive system, so that high gyration ratios, i.e., frequency step-up ratios, can be accomplished.

FIG. 15 is a view taken in accordance with the line 15—15 on FIG. 13, but showing a modified tooth form for the gears 95a and 96a. Incidentally, as will be noted, FIG. 15 shows these two gears as enmeshed at the top, whereas in FIG. 13 they are shown in a position enmeshed at the bottom.

The gear 95a comprises a succession of special teeth 120 having crest portions 121 connected by concave portions 122 and these teeth mesh with a special cooperating internal gear 96a having grooves 123 between convex, substantially semi-cylindrical teeth 124.

In the embodiment here shown, there is one less tooth on the gear 95a than on the gear 96a, with the consequence that when the teeth of the two gears mesh on one side, they abut at their crests on the opposite side, and are thus held out of mesh on the opposite side. The need for the intereference pins 103 and 104 is thus eliminated.

A number of embodiments of the invention have now been disclosed for illustrative purposes, but it will be understood that these are for illustrative purposes only, and that various changes in design, structure and arrangement may be made without departing from the spirit and scope of the appended claims.

I claim:
1. In a sonic vibration system, the combination of: an elastically vibratory system comprised of a resonator having a resonant frequency range and a portion free to vibrate in said resonant frequency range, and sonic vibration generating means for generating vibration in said system in said resonant frequency range comprised of a bearing means fixed to said free portion of said elastically vibratory resonator to vibrate therewith, an inertia rotor guided by said bearing means for turning in an orbital path in engagement with said bearing means, said inertia rotor being drivable around said path to vibrate said resonator at a frequency in the region of the resonant frequency, said inertia rotor having a bearing surface which rolls around a closed path defined by said bearing means so that the periodic force reaction of said inertia rotor in its orbit is delivered to said elastically vibratory resonator via said bearing means, the relative circumferential path dimensions of said bearing means and said bearing surface being different but of similar order of magnitude such that said inertia rotor describes more than one cycle around said bearing means while said inertia rotor turns once relative to its own axis and to roll around said bearing surface, and a rotating drive shaft means for rotating said rotor relative to its own axis, all in such manner that said rotating shaft means causes more than one revolution of said inertia rotor and a corresponding number of elastic vibration cycles in said elastically vibratory system for each revolution of said shaft means, and thereby accomplishing a step-up in frequency from said shaft means to said vibratory system, whereby said drive means experiences reduced angular reaction and enhanced rotational stability in relation to torque pulses transmitted by back reaction from said rotor.

2. The subject matter of claim 1, wherein said drive shaft means include a flexible elastically deformable shaft section.

3. The subject matter of claim 1, wherein said drive shaft means has a flexible section, and has a conical section comprising said rotor for engaging and rolling around said bearing means.

4. The subject matter of claim 1, wherein said drive shaft means embodies a flexible elastic spring element.

5. The subject matter of claim 1, wherein said drive shaft means embodies a shaft and a flexible coil spring surrounding said shaft and interconnecting said shaft and said rotor.

6. The subject matter of claim 1, wherein said drive shaft means embodies a shaft and a multiplicity of bristles extending outwardly from all sides of said shaft, said rotor comprises a hollow cylinder surrounding a portion of said shaft having said bristles and said bristles drivingly engage the interior of said hollow rotor.

7. The subject matter of claim 1, including a motor connected to said rotating shaft means and characterized by a tendency to speed variation, and which motor is held under close speed control by a sonically vibratory back reaction influence from said free vibratory part operating in said resonant frequency range and reaching said rotating shaft and motor at stepped down frequency.

References Cited by the Examiner

UNITED STATES PATENTS

| | | | |
|---|---|---|---|
| 2,194,410 | 3/1940 | Svenson | 259—1 |
| 2,420,793 | 5/1947 | O'Connor | 259—1 |
| 2,546,806 | 3/1951 | Wenander | 74—87 |
| 2,730,176 | 1/1956 | Herbold | 74—87 X |
| 3,004,389 | 10/1961 | Muller | 173—49 X |

FOREIGN PATENTS 358,073  4/1938  Italy.

FRED C. MATTERN, JR., *Primary Examiner.*

BROUGHTON G. DURHAM, MILTON KAUFMAN, *Examiners.*

D. H. THIEL, *Assistant Examiner.*